United States Patent
Pedziwiatr et al.

(10) Patent No.: US 7,069,013 B2
(45) Date of Patent: Jun. 27, 2006

(54) HIGH INTEGRITY RADIO ACCESS NETWORK CLIENT REALLOCATION IN A WIRELESS COMMUNICATION NETWORK

(75) Inventors: Joseph Pedziwiatr, LaGrange, IL (US); Paul Steinberg, Bartlett, IL (US); William S. Pierce, Algonquin, IL (US); Richard James Malcolm, Carol Stream, IL (US); Daniel Francis Tell, Lake Forest, IL (US); Brian Jack Moore, Palatine, IL (US)

(73) Assignee: Motorola, Inc., Schaumbug, IL (US)

( * ) Notice: Subject to any disclaimer, the term of this patent is extended or adjusted under 35 U.S.C. 154(b) by 532 days.

(21) Appl. No.: 10/043,797

(22) Filed: Jan. 11, 2002

(65) Prior Publication Data
US 2003/0134643 A1    Jul. 17, 2003

(51) Int. Cl.
*H04Q 7/20* (2006.01)

(52) U.S. Cl. .......................... 455/452; 455/8; 455/450; 455/452.1; 370/248; 370/252; 370/394

(58) Field of Classification Search ............. 455/452.1, 455/450, 436, 418, 414.1, 446, 561, 8; 370/338, 370/248, 252, 278, 394, 429
See application file for complete search history.

(56) References Cited

U.S. PATENT DOCUMENTS

| | | | |
|---|---|---|---|
| 5,838,770 A | | 11/1998 | Fukushima et al. |
| 6,230,013 B1 * | | 5/2001 | Wallentin et al. ........... 455/436 |
| 6,760,589 B1 * | | 7/2004 | Hobbis ....................... 455/443 |
| 6,928,304 B1 * | | 8/2005 | Wigell et al. ............... 455/561 |
| 2001/0036823 A1 * | | 11/2001 | Van Lieshout et al. ..... 455/418 |
| 2002/0025815 A1 * | | 2/2002 | Rune et al. .................. 455/436 |
| 2003/0003919 A1 * | | 1/2003 | Beming et al. ............. 455/446 |
| 2003/0013443 A1 * | | 1/2003 | Willars et al. .............. 455/432 |
| 2003/0076803 A1 * | | 4/2003 | Chuah ........................ 370/338 |
| 2003/0081592 A1 * | | 5/2003 | Krishnarajah et al. ...... 370/352 |
| 2003/0190915 A1 * | | 10/2003 | Rinne et al. ................ 455/436 |
| 2004/0053627 A1 * | | 3/2004 | Fiter et al. ............... 455/456.1 |

FOREIGN PATENT DOCUMENTS

| EP | 0 301 500 A2 | | 2/1989 |
|---|---|---|---|
| WO | WO 01/41493 | * | 6/2001 |
| WO | WO-01/52571 A1 | | 7/2001 |

OTHER PUBLICATIONS

International Search Report for Application No. PCT/US02/41764 dated Jun. 4, 2003.

* cited by examiner

*Primary Examiner*—Joseph Feild
*Assistant Examiner*—Khawar Iqbal
(74) *Attorney, Agent, or Firm*—Simon B. Anolick

(57) ABSTRACT

A wireless communication system (10) uses communications bridging functions to establish redundant communication paths (32, 34, 44, 46) between redundant radio access network session clients (36, 38), a core system 16 and a base transceiver station (40). The system (10) carries out a handoff or reallocation of call control from one of the radio access network session clients (36, 38) to another one of the radio access network session clients (36, 38) based on the integrity of the redundant communication paths (32, 34, 44, 46).

16 Claims, 2 Drawing Sheets ial paths. However, movements of the mobile termination
HIGH INTEGRITY RADIO ACCESS NETWORK CLIENT REALLOCATION IN A WIRELESS COMMUNICATION NETWORK

FIELD OF THE INVENTION

The invention relates to wireless communication networks, and more particularly to high integrity radio access network client reallocation in a wireless communication network.

BACKGROUND OF THE INVENTION

Wireless communication systems or networks such as, for example, cellular telephone communication systems, are commonplace. Some recent developments in connection with wireless communication systems or networks have focused on the use of packet-switched networks, instead of circuit-switched networks, to improve the operation of the wireless communication networks. In general, the use of packet-switched networks enables the development of more complex call routing techniques that may improve call quality and/or that may improve the operating efficiency of the wireless communication network. Wireless communication network quality and efficiency improvements are particularly important due to the rapidly growing volume of wireless subscribers, the increasing complexity and numbers of services being provided and applications being performed via wireless communication networks, and changing international standards. In fact, many of the recently developed switched-packet based wireless communication networks are specifically adapted to support third generation mobile telecommunications systems such as, for example, systems based on CDMA2000 technology, universal mobile telecommunications systems (UMTS) technology, etc.

Wireless communication networks that are based on packet-switched networks typically include a plurality of radio access networks (RANs), each of which is a packet-switched network and each of which is communicatively coupled to one or more base transceiver stations (BTSs). Mobile termination devices or mobile stations such as, for example, cellular phones, send radio frequency signals to and receive radio frequency signals from one or more BTSs. The BTSs convey information (e.g., voice, data, etc.) carried by the radio frequency signals to one or more RANs. The RANs are similar to base station subsystems, which are typically used within second generation CDMA and GSM wireless communication networks. However, in contrast to base station subsystems, RANs typically communicate with one or more other packet-switched networks that enable the RANs to communicate with each other, with other services or applications, etc. In this manner, mobile termination devices or mobile stations may readily access a wireless communication network to interact with one or more services being provided by the wireless network.

When a mobile termination device or mobile system accesses a wireless communication network and requests a service, a set of resources and path connections such as, for example, control and bearer paths, are established to support the requested service. Of course, depending on the nature of the requested service, one or more control paths and one or more bearer paths may be provided for each session or call. The physical communication paths or connections (i.e., the call configuration) initially established at the time the mobile termination device accesses the communication system may provide minimal or acceptable control latency and bearer path delays. However, movements of the mobile termination device through the area covered by the communication system, as well as the dynamic transmission characteristics of the communication system, may cause the initial communication call configuration to become problematic or unacceptable. For example, as a mobile termination device nears or crosses a boundary between the coverage areas of adjacent RANs, the control and bearer path delays may result in excessive control latency and excessive and/or differential bearer path delays.

Some wireless communication networks or systems use a RAN session client (RSC) to manage and/or optimize the control and bearer path configurations for each call or mobile termination device that is communicatively coupled to the RAN. Typically, the RSC attempts to optimize the communication path or connection configuration for each call or session as the mobile termination device physically moves within the area covered by the RAN. Additionally, wireless communication networks may also enable the physical location of the RSC for a session or call to physically move between RSCs as the mobile termination device associated with the call moves near to or crosses a border between RANs. In this way, the location of the RSC may be changed or handed off to dynamically optimize the call configuration.

Unfortunately, RSC reallocations or handoffs are typically implemented using intrusive techniques such as, for example, CDMA hard handoffs, that break connections along active control and bearer paths associated with a session or call and then establish new communication paths or connections (e.g., new control and bearer paths) for the session or call. Such hard handoffs can substantially reduce call quality and, in a case where the new communication paths or connections have inadequate integrity and/or cannot be established, call quality may be degraded and/or the session or call may be lost or dropped. Thus, there is a need for a method and apparatus for a high integrity handoff of a radio access network session client within a wireless network.

BRIEF DESCRIPTION OF THE DRAWINGS

The invention will be described in terms of several preferred embodiments to illustrate its broad teachings. Reference is also made to the attached drawings in which.

DETAILED DESCRIPTION OF THE PREFERRED EMBODIMENTS

Figure 1:
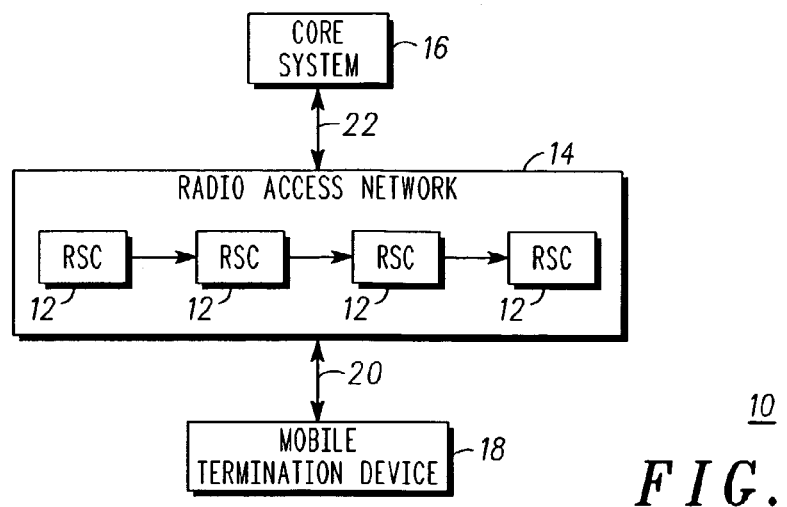
FIG. 1 is an exemplary block diagram of a wireless communication system that enables high integrity reallocation of a radio access network session client between and within radio access networks.

FIG. 1 is an exemplary block diagram of a wireless communication system 10 that enables high integrity reallocations or handoffs of a radio access network session client (RSC) 12 between and within radio access networks (RANs) 14. As shown in FIG. 1, a core system 16 provides the transmission, local control and communications management functions that enable mobile termination devices such as, for example, a mobile termination device 18, to connect to end user services (not shown) and/or to connect one end user service to another end user service. The core system 16 may include, for example, circuit gateways that enable communications with public switched telephone networks, public data networks, and/or may include any other fixed equipment such as switching circuitry connected via land lines or any other suitable communication media. The core system 16 may also include one or more workstations or computers (not shown), which function as servers that execute programs to enable the efficient routing of calls and/or other information to, from and between services that may be communicatively coupled to the core system 16.

The RANs 14 may include BTSs as well as one or more workstations or computers (not shown) that function as servers and which facilitate the processing and routing of call or session information being sent to or received from the mobile termination device 18. The mobile termination device 18 may be a cellular telephone, a paging device, a portable computer (e.g., a laptop, handheld, etc.) or any other desired wireless communication device or platform.

Generally speaking, the wireless communication system 10 enables the RSC 12, which is associated with a particular call or session initiated by the mobile termination device 18, to be reallocated within a single one of the RANs 14 and/or between two or more of the RANs 14. Importantly, the wireless communication system 10 carries out the reallocation, switchover or handoff of the RSC 12 from one location to another without exposing a user of the mobile termination device 18 to service interruptions, poor quality service, etc. The reallocation or handoff may move the RSC 12 from one location within a RAN to another location within the RAN or from one RAN to another RAN. More specifically, the wireless communication system 10 is adapted to physically move (i.e., reallocate) session or call management functions (i.e., the RSC 12) from one location to another location within the system 10 without disrupting the radio frequency communication paths or connections 20 that convey call or session information between the mobile termination device 18 and the RANs 14 and without disrupting the connections or communication paths 22 that convey session or call information between the core system 16 and the RANs 14. In particular, the core system 16 and the RANs 14 include bridging functions that enable the mobile termination device 18 to have redundant sets of control and bearer paths for a given call or session. More specifically, each of the bridging functions provides a Y-type communication mechanism in which one of two communication paths (e.g., the two arms of the Y) is selectively coupled to a single communication path (e.g., the tail or leg of the Y). For example, the two arms of the Y may simultaneously receive communications associated with a particular mobile termination device via different communication paths, which may include different BTSs, different RSCs, etc., and the bridging function is adapted to selectively pass communications received via one of the two arms to the leg or tail of the Y. In this manner, the bridging functions enable a single mobile termination device to communicate via multiple communication paths which, as described in greater detail below, enables high integrity handoffs of the RSC for a session or call from one physical location to another. In addition, the wireless communication system 10 further includes integrity checking functions that enable the integrity of the redundant sets of control and bearer paths to be checked prior to terminating, disconnecting or tearing down another set of communication paths and resources associated with a session or call.

In operation, the mobile termination device 18 initiates a call or session that is carried out via the radio frequency connections 20 and the core connections 22. As the mobile termination device 18 moves through the area covered by the RANs 14, the radio frequency (RF) connections 20 may be changed in known manners, or in any other manner, so that the mobile termination device 18 is in communication with the BTS to which it is physically closest and/or the BTS that provides the highest call quality (e.g., the fewest transmission errors, the highest signal-to-noise ratio, etc.). In addition, the wireless communication system 10 also enables the physical location of the RSC 12 for the call or session associated with the mobile termination device 18 to move within and between the RANs 14 so that control and bearer path delays or latencies may be minimized to improve call quality. In contrast to known RSC reallocation techniques or systems such as, for example, systems or techniques that use CDMA hard handoffs, the wireless communication system 10 shown in FIG. 1 uses redundant communication paths through the RANs 14 to isolate the core connections 22 and the RF connections 20 from the movement or reallocation of the RSC 12 from one location within the RANs 14 to another location.

Figure 2:
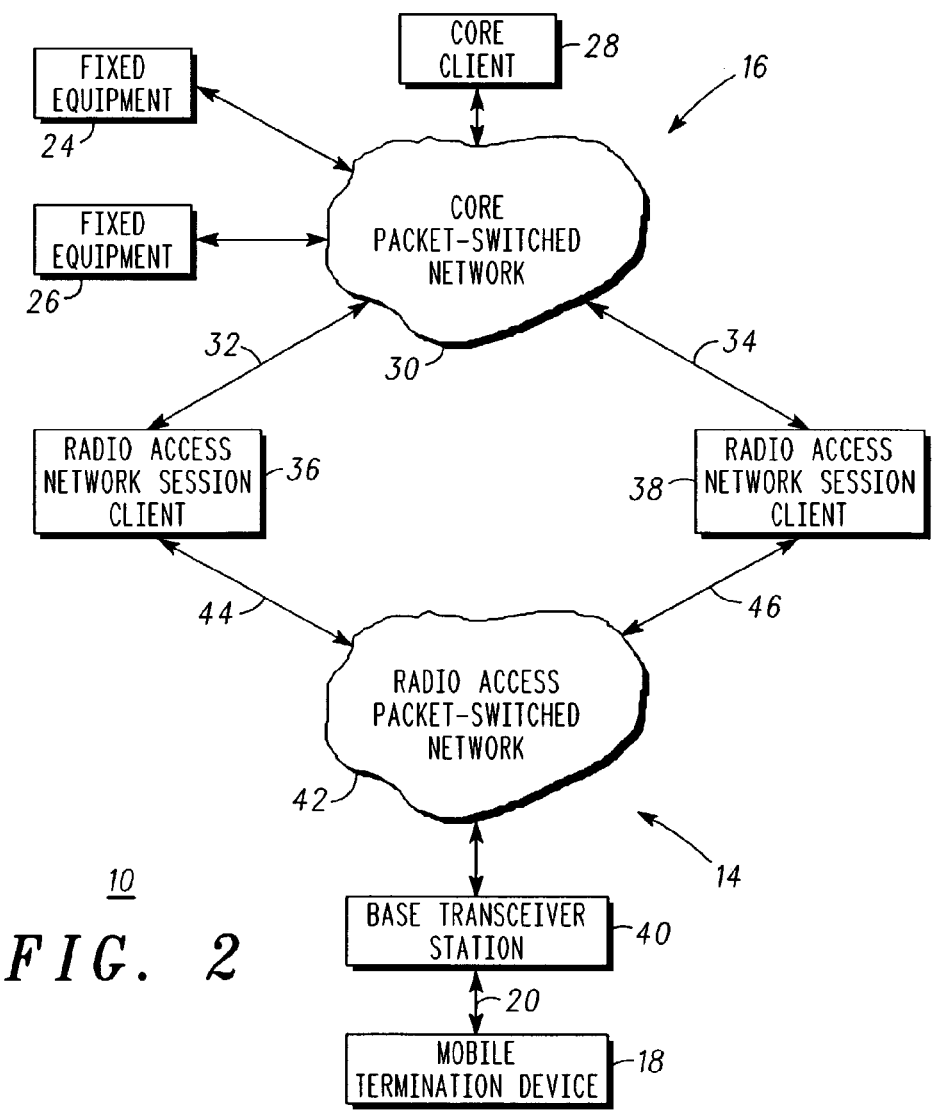
FIG. 2 is more detailed block diagram of the system shown in FIG. 1.

FIG. 2 is more detailed block diagram of the wireless communication system 10 shown in FIG. 1. As shown in FIG. 2, the core system 16 includes fixed equipment 24 and 26 and a core client 28. The fixed equipment 24 and 26 may be, for example, circuit gateways that enable the wireless communication system 10 to communicate with hardwired networks (e.g., public switched telephone networks, public data networks, etc.), packet gateways that enable the system 10 to communicate with other packet-switched networks (e.g., the Internet), or any other type of gateway desired that enables the system 10 to exchange information with and/or to communicate with other systems and devices. If desired, the fixed equipment 24 and 26 may include any number and/or combination of circuit gateways.

The core client 28 is preferably software executed on one or more workstations or computers (not shown) associated with the core system 16. In general, the core client 28 is adapted to mediate service requests received from mobile termination devices or systems such as, for example, the mobile termination device 18, and to perform bearer stream routing and control. Importantly, the core client 28 is communicatively coupled to the fixed equipment 24 and 26 via a packet-switched network 30 which may, for example, convey digital information using internet protocol (IP) packets or any other suitable packet communication protocol and media. The core client 28 is adapted to perform a communications bridging function that enables the core client 28 to establish and communicate via a set of redundant communication paths 32 and 34 with redundant RSCs 36 and 38. The RSCs 36 and 38 are associated with different physical locations within the wireless communication system 10. For example, one of the RSCs 36 and 38 may be associated with a location within a first one of the RANs 14 and the other one of the RSCs 36 and 38 may be associated with a location within another one of the RANs 14. Alternatively, the RSCs 36 and 38 may be associated with different physical locations within a single one of the RANs 14.

The RSCs 36 and 38 may be communicatively coupled to the mobile termination device 18 via a BTS 40, a radio access packet-switched network 42 and redundant communication paths 44 and 46. Similar to the core packet-switched network 30, the radio access packet-switched network 42 may use, for example, IP packets or any other packets, communication protocol and media desired. The BTS 40 includes a bridging function that enables the BTS 40 and, thus, the mobile termination device 18, to communicate simultaneously with the RSCs 36 and 38 via the redundant communication paths 44 and 46.

The redundant communication paths 32 and 34 and the redundant communication paths 44 and 46 may simultaneously carry session or call information associated with the mobile termination device 18. However, when the initial call configuration is established (i.e., when the mobile termination device 18 initially requests service and connects to the system 10) only one RSC is established within the RANs 14. By way of example, the RSC 36 and the communication paths 32 and 44 may initially be provided by the system 10 to enable the mobile termination device 18 to communicate with the core system 16 and, thus, any end user service that may be communicatively coupled to the core system 16. As the mobile termination device 18 moves through the area covered by the RANs 14, the communications bridging functions within the core client 28 and the BTS 40 may be used to establish communication paths 34 and 46. Additionally, the RSC 38 may be instantiated as a redundant RSC for managing communications associated with the mobile termination device 18. The redundant RSC 38 may be physically located within same one of the RANs 14 that the RSC 36 is located in or, alternatively, may be located within a different one of the RANs 14. The selection of an appropriate location for instantiation of the redundant RSC 38 may be based on path optimization criteria, call quality criteria, resource availability, etc.

The communication paths 32, 34, 44 and 46 shown in FIG. 2 may each include one or more control and bearer paths, as needed to suit a particular application, service, etc. In other words, depending on the nature of the session or call that has been initiated by the mobile termination device 18, each of the communication paths 32, 34, 44 and 46 may require multiple bearer paths and/or multiple control paths. Further, while only two RSCs are shown in FIG. 2, more than two RSCs may be instantiated for a given call or session associated with the mobile termination device 18, if desired.

In addition to enabling the establishment of redundant communication paths, the bridging functions within the core client 28 and the BTS 40 may also include integrity checking functions. For example, frame erasure rates, propagation delay or any other frame quality parameter may be used to determine or validate the integrity of bearer path communications, sequence numbers (e.g., those used in connection with CDMA-based communications) may be used to determine whether a BTS is synchronized with one of the RANs 14, thereby enabling a determination of the integrity of control path communications, etc.

Figure 3:
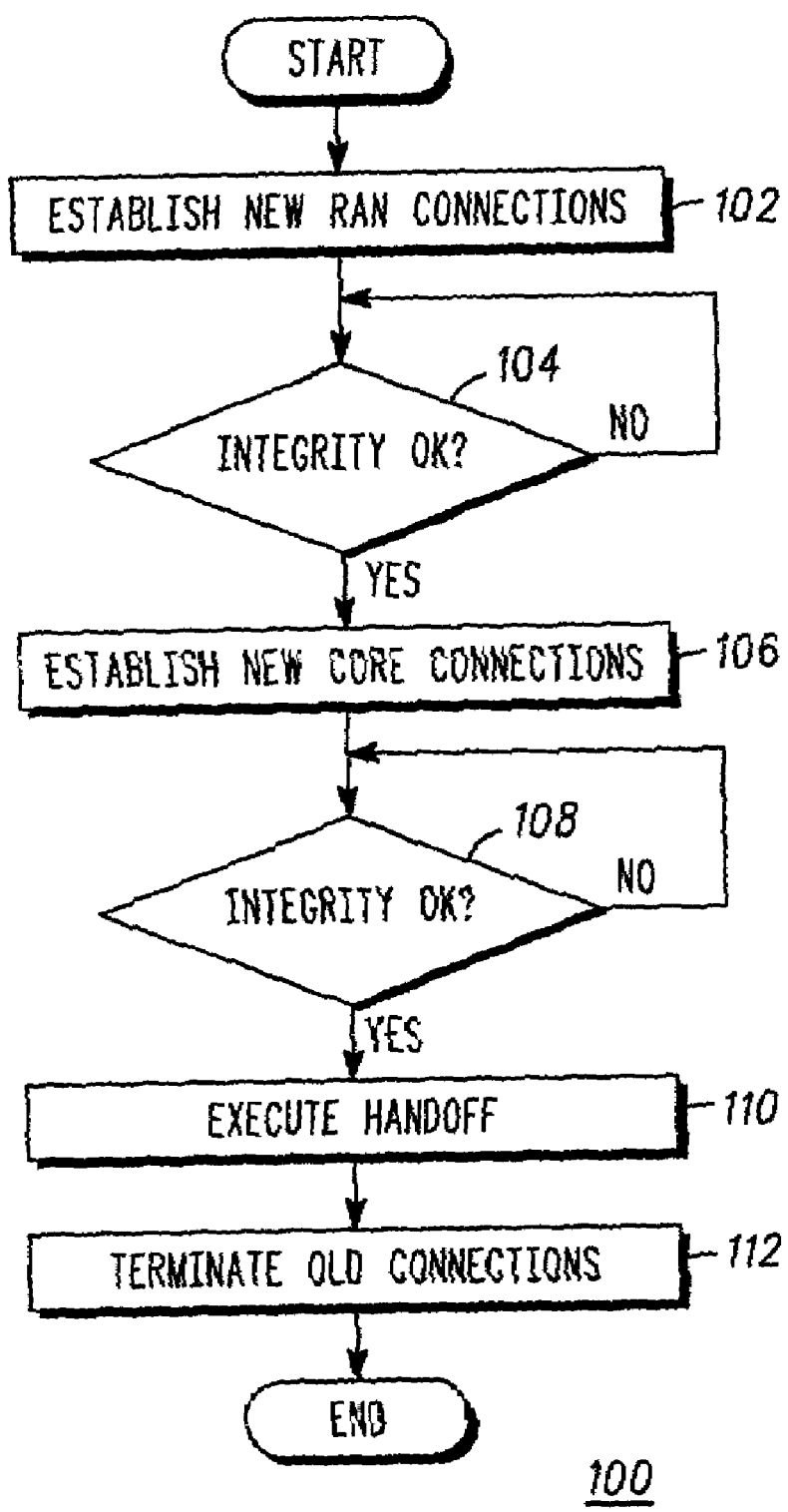
FIG. 3 is a flow diagram that depicts one manner in which the system shown in FIGS. 1 and 2 may be used to carry out a high integrity reallocation of a radio access network session client.

FIG. 3 is a flow diagram 100 that depicts one manner in which the system 10 shown in FIGS. 1 and 2 may be used to carry out a high integrity reallocation or handoff of an RSC. Initially, a mobile termination device such as, for example, the mobile termination device 18 shown in FIGS. 1 and 2, may have established a session or call using a configuration that communicates with the core system 16 via the RSC 36 and communication paths or connections 32 and 44 (FIG. 2). As the mobile termination device 18 moves through the area covered by the RANs 14, control and bearer path latencies may become excessive, thereby invoking the system 10 to initiate a reallocation of the RSC 36 to another location within the RANs 14. With reference to FIGS. 2 and 3, at block 102, the system 10 responds to a request to reallocate the RSC 36 by using the bridging function within the BTS 40 to establish a new or redundant communication path (e.g., the path 46), which enables the mobile termination device 18 to communicate with the RSC 38 (which acts as a redundant RSC). At block 104, the bridging function within the BTS 40 checks the integrity of the communication path 46 using any desired technique, including the frame erasure and sequence checking techniques described above. At block 106, the core client 28 uses its bridging function to establish a new or redundant communication path (e.g., the path 34) that enables the redundant RSC 38 and, thus, the mobile termination device 18, to communicate with the core client 28. Of course, the communication paths 34 and 46 may each include a plurality of communication paths including, for example one or more control paths and/or one or more bearer paths.

At block 108, the core client 28 uses its bridging function to check or determine the integrity of the communication path 34. At block 110, the system 10 executes a reallocation or handoff of the RSC 36 to the redundant or new RSC 38. To carry out the reallocation, the control information and parameters stored within the RSC 36 are transferred to the new or redundant RSC 38 and, when the transfer is complete (assuming the integrity of the communication paths 34 and 46 has been determined to be acceptable), the RSC 38 takes control of the session or call associated with the mobile termination device 18. At block 112, the initial resources and communication paths (e.g., the communication paths 32 and 44, the RSC 36, etc.) may be terminated or torn-down to free these resources and/or paths for use by another mobile device.

Thus, the wireless communication system 10 may be used to accomplish a non-intrusive or seamless RSC reallocation or handoff that isolates the mobile termination device 18 and the core client 28 from the reallocation process. More specifically, the RF connections 20 and the connections between the core client 28 and the fixed equipment 24 and 26 may remain unchanged during the RSC reallocation process, thereby improving call quality and reducing the risk that a call or session will be lost or dropped due to a failed or unacceptable connection. Further, because the system 10 can determine or verify the integrity of the new communication paths to be used at the new RSC location prior to terminating or tearing down the communication paths currently being used, the system 10 enables such RSC reallocations or handoffs to occur only in the event that the new connections or paths will be acceptable, thereby providing a high integrity reallocation or handoff.

Although certain apparatuses may be constructed and methods may be performed in accordance with the teachings herein, the scope of coverage of this patent is not limited thereto. On the contrary, this patent covers all embodiments of the teachings fairly falling within the scope of the appended claims, either literally or under the doctrine of equivalents. The invention, therefore, is not and should not be taken to be limited to the embodiments described herein.

We claim:

1. A wireless communication system, comprising:
a core system adapted to establish a first set of redundant communication paths between the core system and respective first and second radio access network session clients associated with respective first and second locations within the wireless communication system; and
a base transceiver station adapted to establish a second set of redundant communication paths between the base transceiver station and the respective first and second radio access network session clients, wherein the first and second sets of redundant communication paths are adapted to simultaneously convey communications associated with a mobile communication device and wherein one of the core system and the base transceiver station is adapted to determine the integrity of a communication path from the first and second sets of redundant bearer communication paths using frame erasure rates and to determine the integrity of a communication path from the first and second sets of redundant control communication paths using sequence numbers.

2. The wireless communication system of claim 1, wherein the respective first and second locations are associated with respective first and second radio access networks.

3. The wireless communication system of claim 1, wherein the core system includes fixed equipment.

4. The wireless communication system of claim 1, wherein the first and second sets of redundant communication paths include control and bearer paths.

5. The wireless communication system of claim 1, wherein the mobile communication device is a cellular phone.

6. A wireless communication system, comprising:
a core system having a first bridging function adapted to establish a first set of redundant communication paths between the core system and a plurality of radio access network session clients; and
a base transceiver station having a second bridging function adapted to establish a second set of redundant communication paths between the plurality of radio access network session clients and the base transceiver station, wherein the first and second sets of redundant communication paths are adapted to simultaneously convey communications associated with a mobile communication device and wherein one of the core system and the base transceiver station is adapted to determine the integrity of a communication path from the first and second sets of redundant bearer communication paths using frame erasure rates and to determine the integrity of a communication path from the first and second sets of redundant control communication paths using sequence numbers.

7. The wireless communication system of claim 6, wherein the first and second sets of redundant communication paths are associated with respective first and second locations within the wireless communication system.

8. The wireless communication system of claim 7, wherein the respective first and second locations within the wireless communication system are associated with respective first and second radio access networks.

9. The wireless communication system of claim 6, wherein the core system includes fixed equipment.

10. The wireless communication system of claim 6, wherein the first and second sets of redundant communication paths include control and bearer paths.

11. A wireless communication system, comprising:
a core system; and
a base transceiver station, wherein the core system and the base transceiver station are adapted to convey communications associated with a mobile communication device using a plurality of redundant communication paths and a plurality of redundant radio access network session clients wherein the first and second sets of redundant paths are adapted to simultaneously convey communications associated with a mobile communication device and wherein one of the core system and the base transceiver station is adapted to determine the integrity of a communication path from the first and second sets of redundant bearer communication paths using frame erasure rates and to determine the integrity of a communication path from the first and second sets of redundant control communication paths using sequence numbers.

12. The wireless communication system of claim 11, wherein each of the plurality of redundant radio access network session clients is associated with a different location within the wireless communication system.

13. The wireless communication system of claim 11, wherein each of the plurality of redundant radio access network session clients is associated with a different one of a plurality of communicatively coupled radio access networks within the wireless communication system.

14. A wireless communication system, comprising:
a core system; and
a plurality of communicatively coupled radio access networks, wherein each of the plurality of communicatively coupled radio access networks is adapted to establish redundant communication paths for a mobile device and wherein each of the radio access networks is adapted to establish a radio access network session client associated with the redundant communication paths and wherein one of the core system and the radio access networks are adapted to determine the integrity of a communication path from the first and second sets of redundant bearer communication paths using frame erasure rates and to determine the integrity of a communication path from the first and second sets of redundant control communication paths using sequence numbers.

15. The wireless communication system of claim 14, wherein each of the plurality of communicatively coupled radio access networks is adapted to determine the integrity of its respective redundant communication paths for the mobile device.

16. The wireless communication system of claim 15, wherein each of the radio access networks includes a base transceiver station adapted to provide a communications bridging function between the mobile device and the radio access network session clients.

* * * * *